US005550988A

United States Patent [19]
Sarangdhar et al.

[11] Patent Number: 5,550,988
[45] Date of Patent: Aug. 27, 1996

[54] APPARATUS AND METHOD FOR PERFORMING ERROR CORRECTION IN A MULTI-PROCESSOR SYSTEM

[75] Inventors: Nitin V. Sarangdhar, Beaverton; Konrad K. Lai, Aloha, both of Oreg.

[73] Assignee: Intel Corporation, Santa Clara, Calif.

[21] Appl. No.: 205,604

[22] Filed: Mar. 1, 1994

[51] Int. Cl.$^6$ .................................................. G06F 13/36
[52] U.S. Cl. ............................ 395/293; 395/299; 395/288
[58] Field of Search ........................................ 395/325, 575, 395/200, 275, 375, 500, 800, 293, 296, 299, 303, 287, 288, 185.01, 729, 730, 861, 726; 371/47.1, 32, 12

[56] References Cited

U.S. PATENT DOCUMENTS

| | | | |
|---|---|---|---|
| 4,373,183 | 2/1983 | Means et al. | 395/325 |
| 4,438,494 | 3/1984 | Budde et al. | 395/575 |
| 4,779,089 | 10/1988 | Theus | 340/825.5 |
| 4,982,402 | 1/1991 | Beaven et al. | 371/12 |
| 5,068,781 | 11/1991 | Gillett, Jr. et al. | 395/325 |
| 5,388,232 | 2/1995 | Sullivan et al. | 395/325 |
| 5,410,710 | 4/1995 | Sarangdhar et al. | 395/725 |

OTHER PUBLICATIONS

"The Metaflow Architecture", pp. 10–13 and 63–73, by Val Popescu, Merle Schultz, John Spracklen, Gary Gibson, Bruce Lightner, and David Isaman, IEEE Micro, 1991.

*Primary Examiner*—Jack B. Harvey
*Assistant Examiner*—Glenn A. Auve
*Attorney, Agent, or Firm*—Blakely, Sokoloff, Taylor & Zafman

[57] ABSTRACT

In a multi-processor system having a first processor, a second processor, and a bus coupling the first processor to the second processor, a method for correcting an erroneous signal corresponding to the first processor while maintaining lock atomicity. When an erroneous transaction is detected, the first processor aborts that transaction and performs a retry. On the retry, an arbitration process arbitrates between the first processor and the second processor to determine which processor is granted access to the bus. If an error is detected during the arbitration process, an arbitration re-synchronization process is initiated. In the arbitration re-synchronization process, bus requests are de-asserted and then re-arbitrated. In the re-arbitration process, the first processor initiates its request ahead of the other processor in order to maintain lock atomicity.

34 Claims, 9 Drawing Sheets

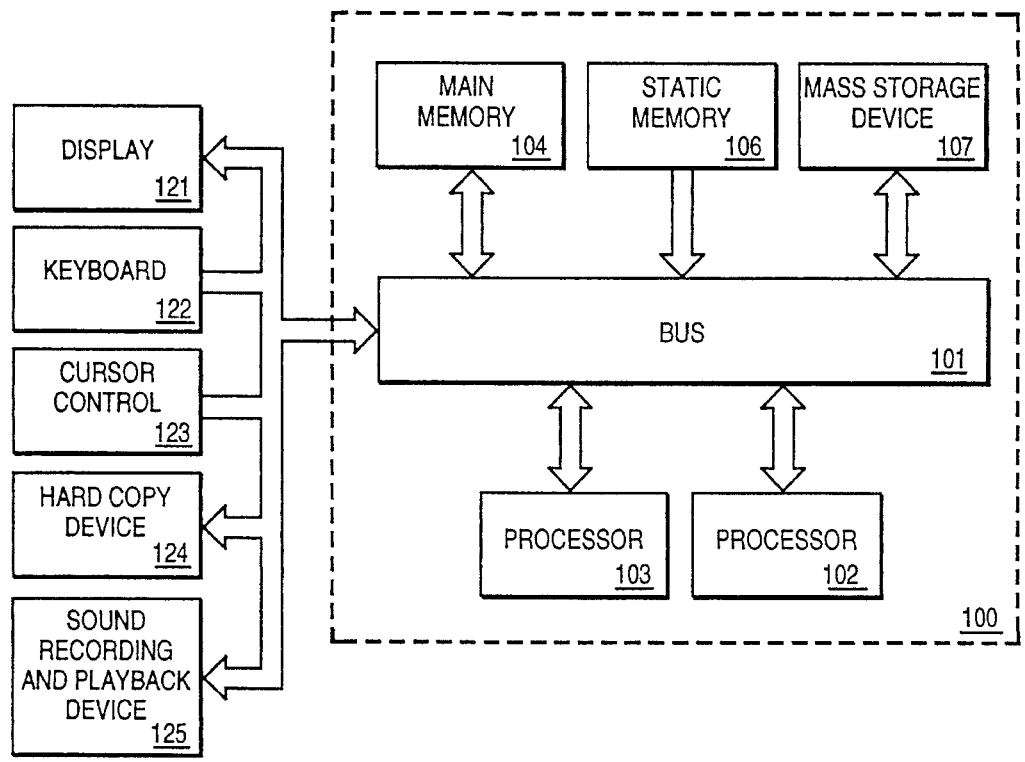
FIG_1
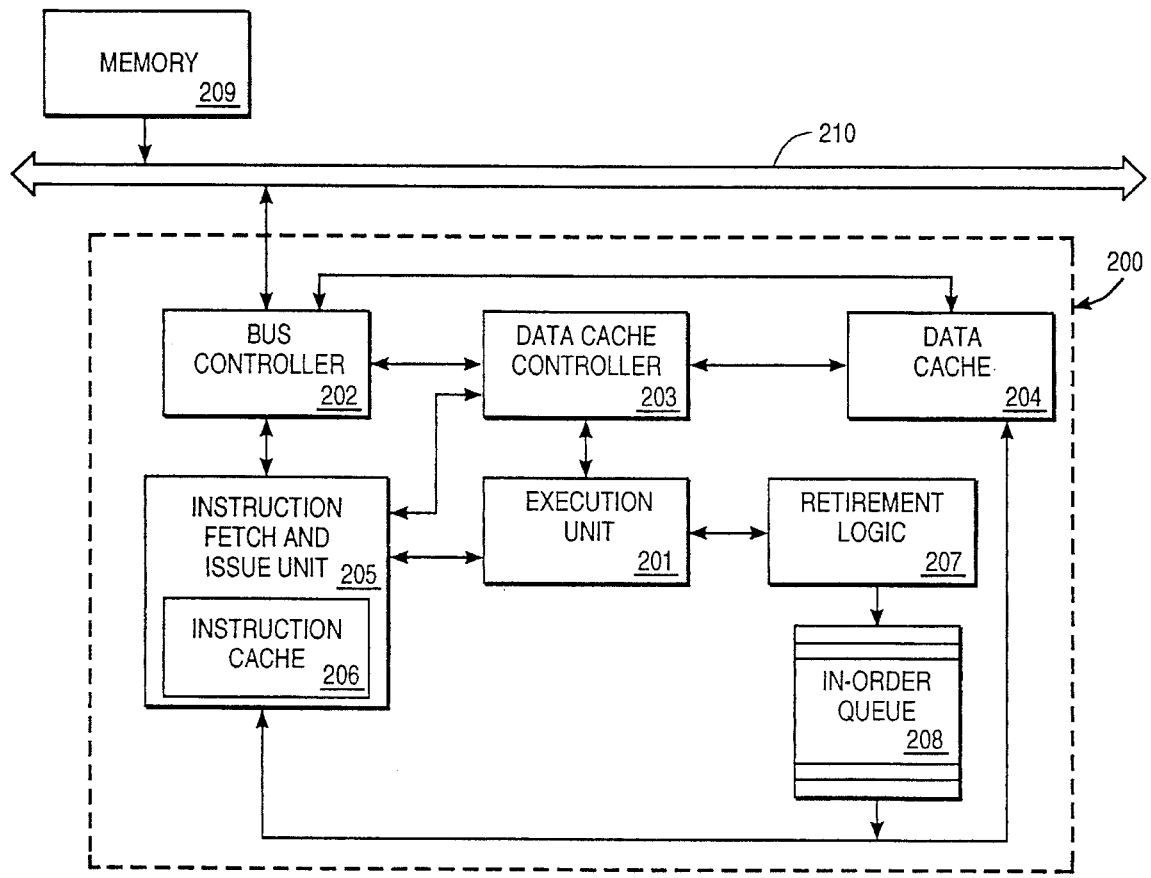
FIG_2

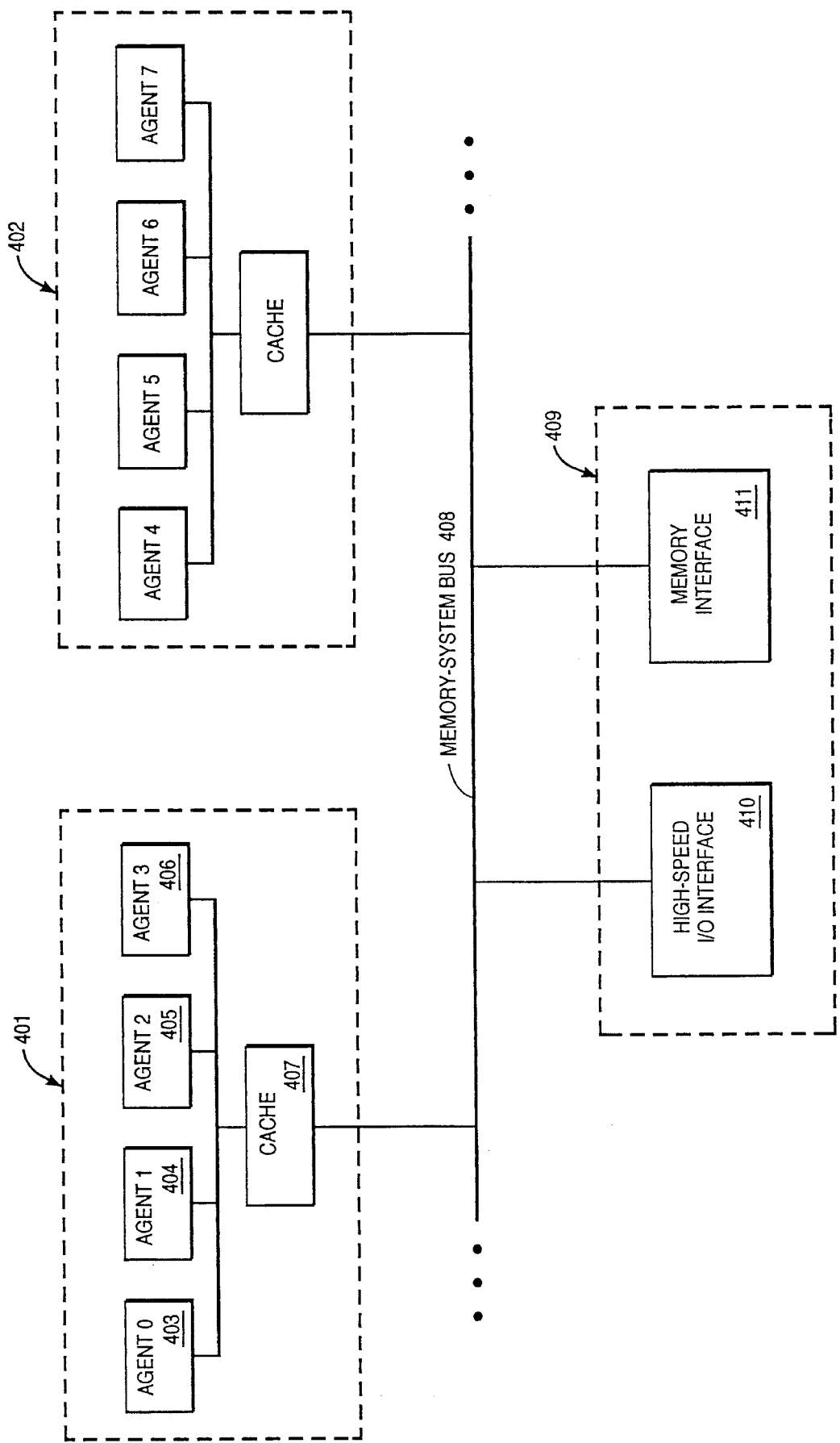
FIG_4

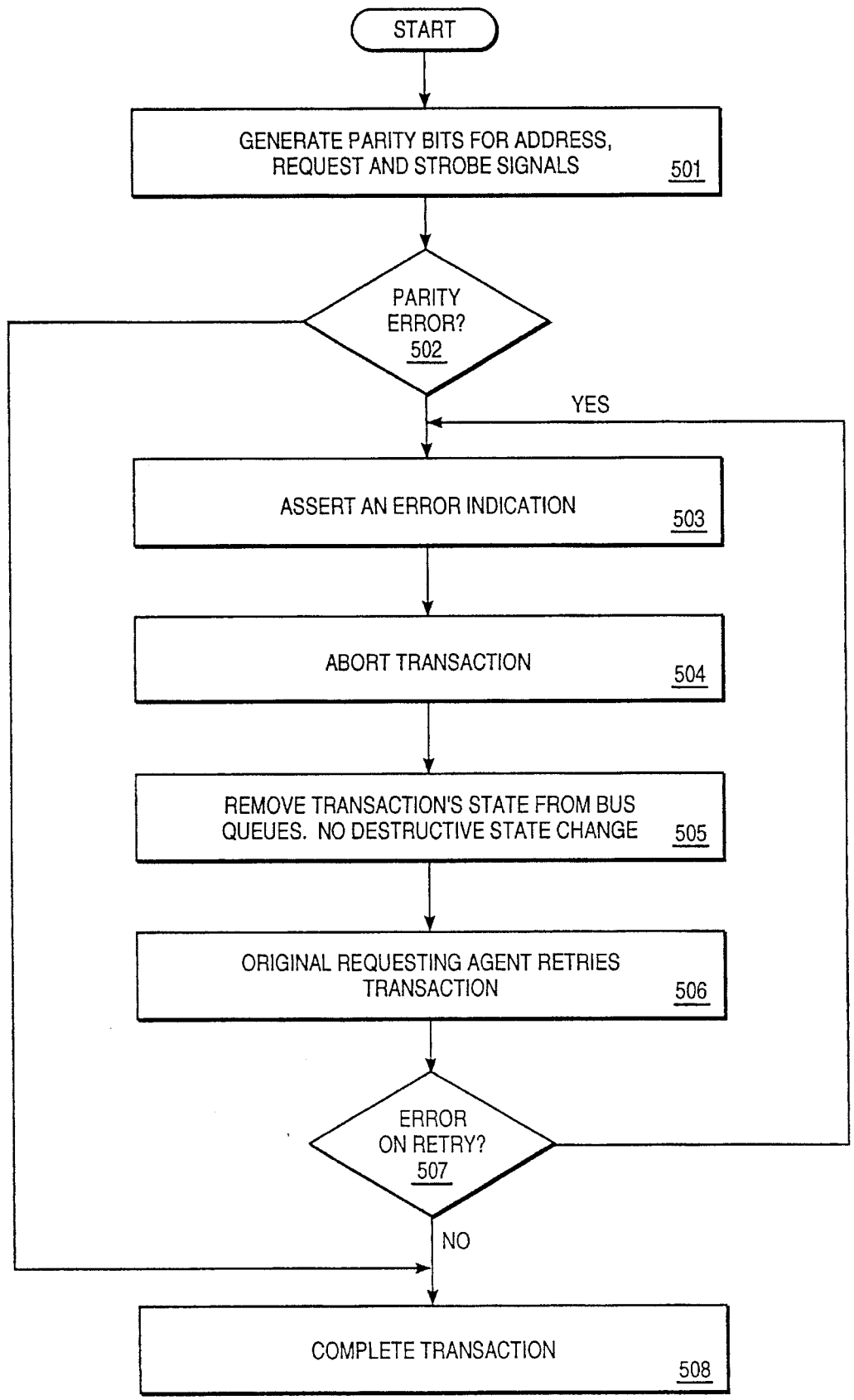
FIG_5

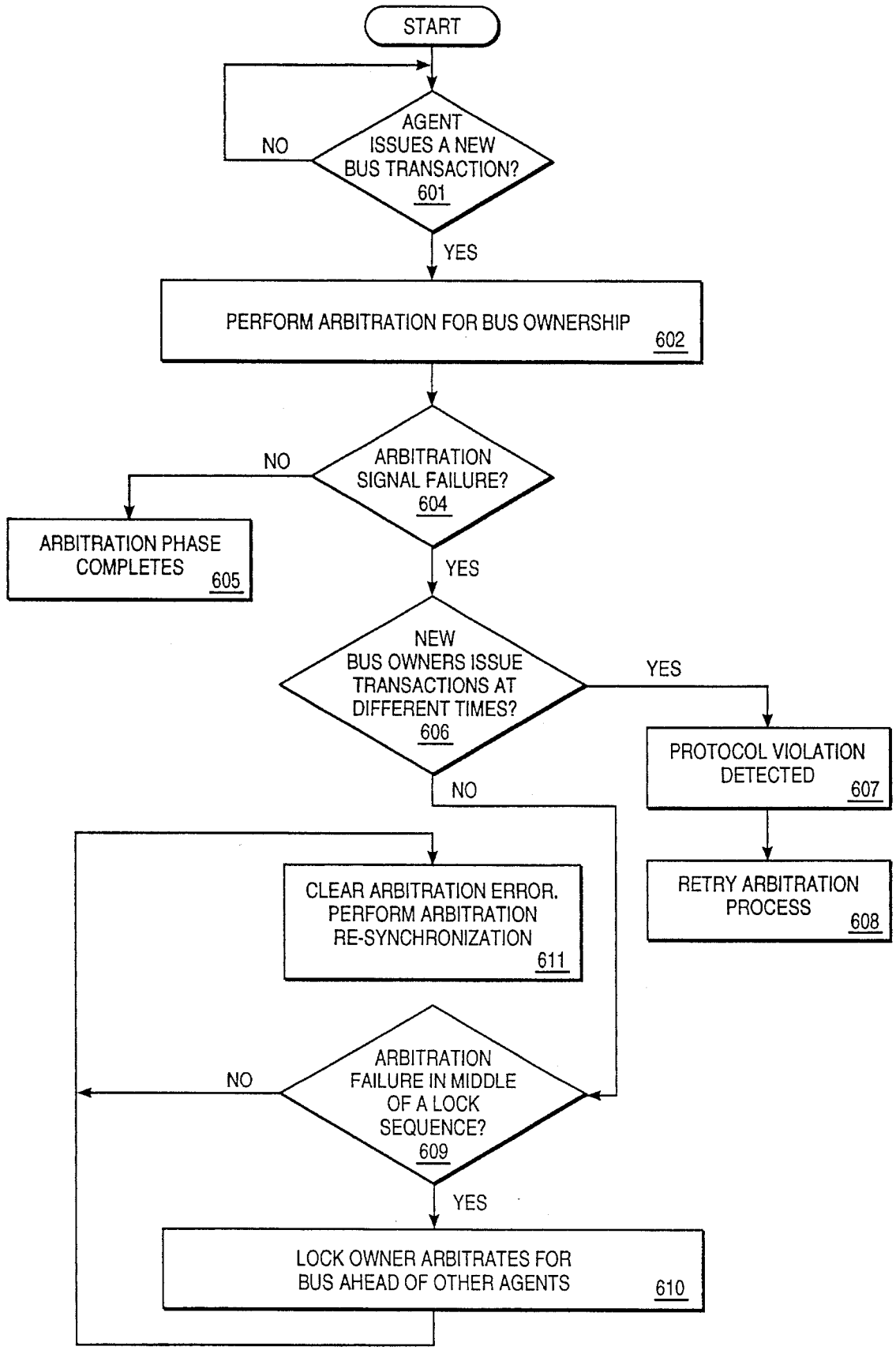
FIG_6

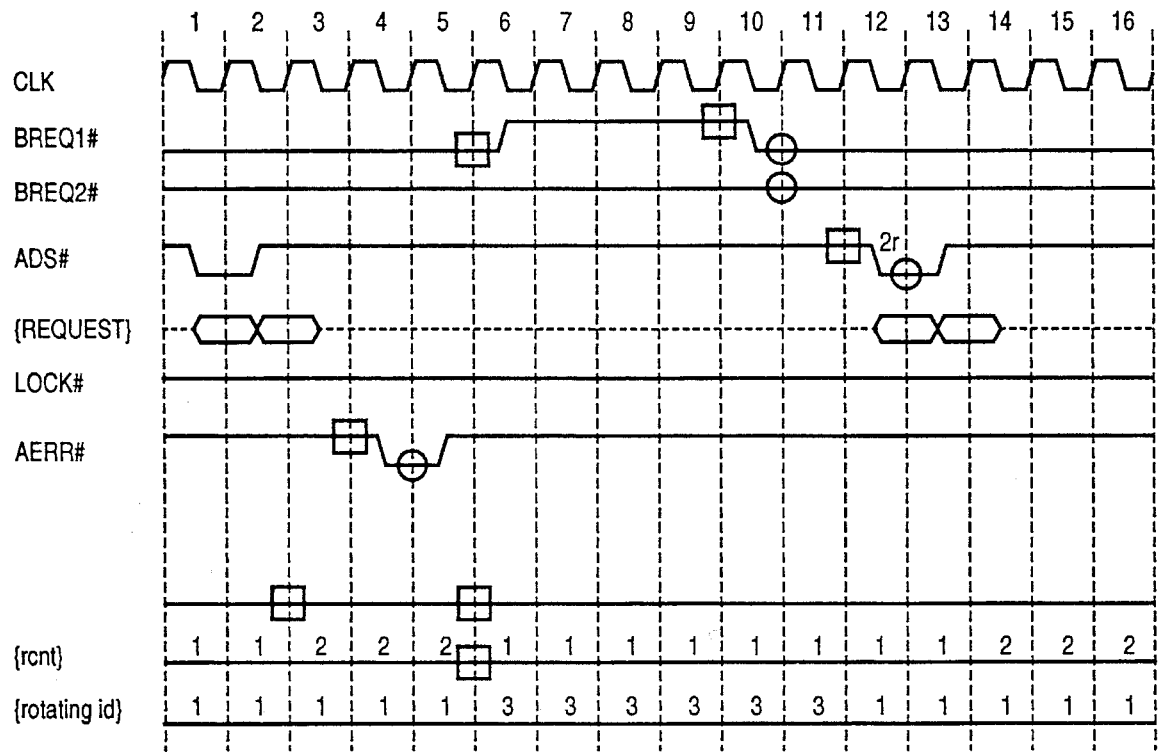
FIG_7
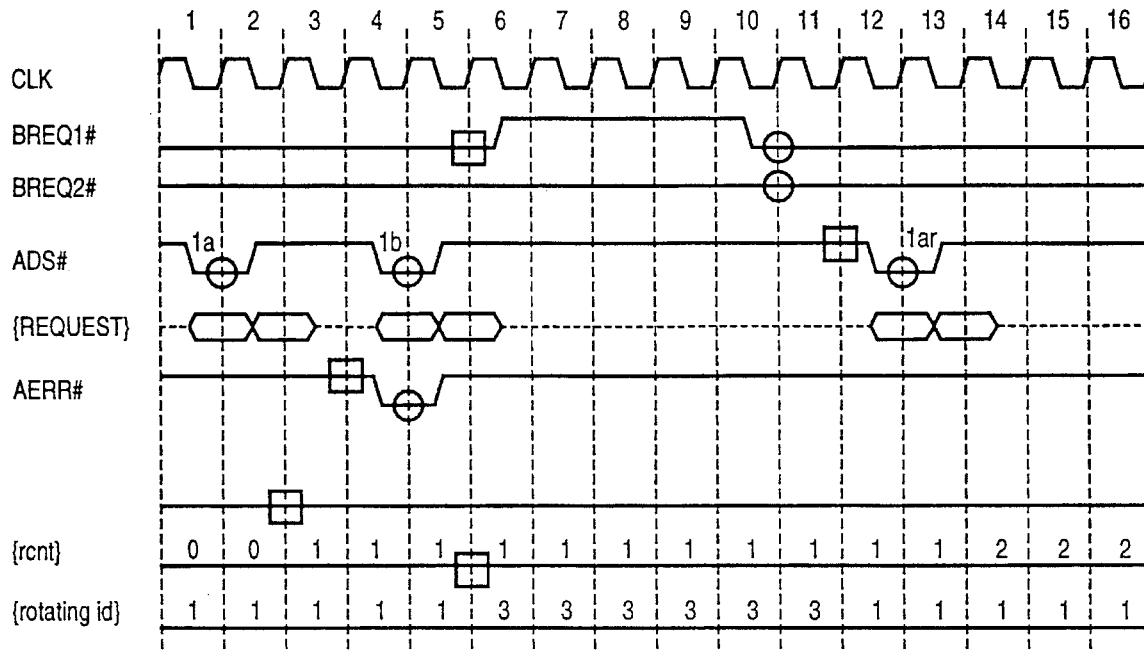
FIG_8

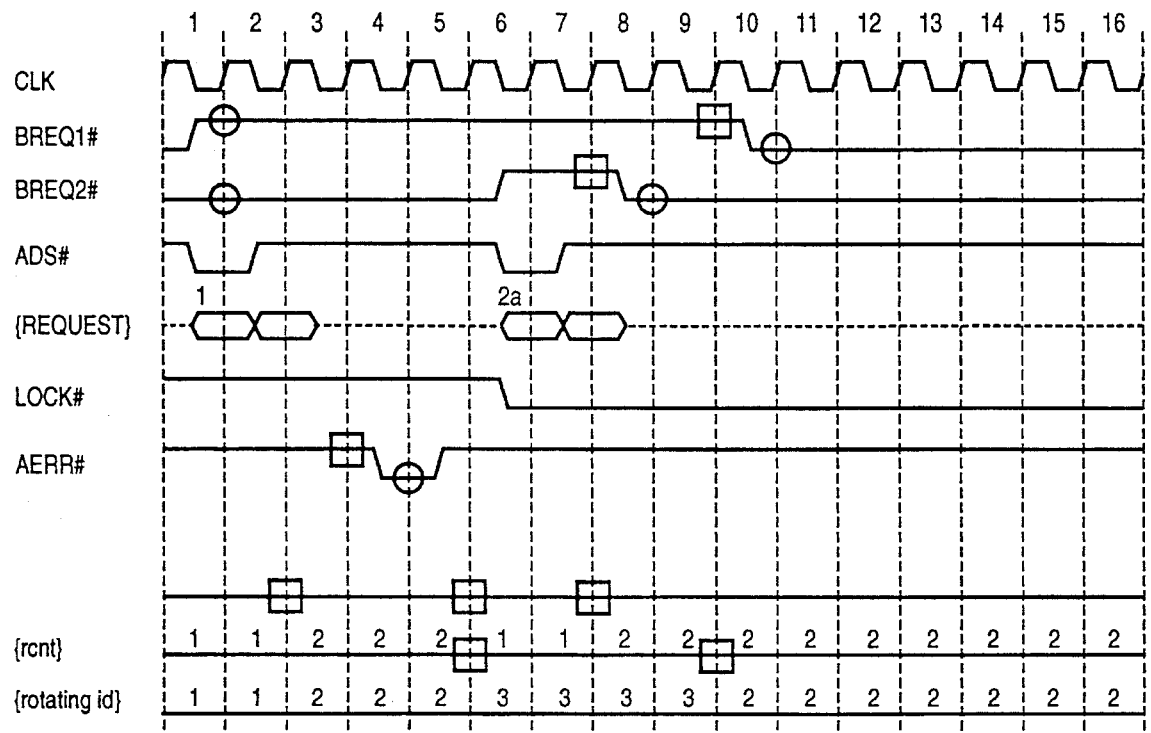
FIG_9
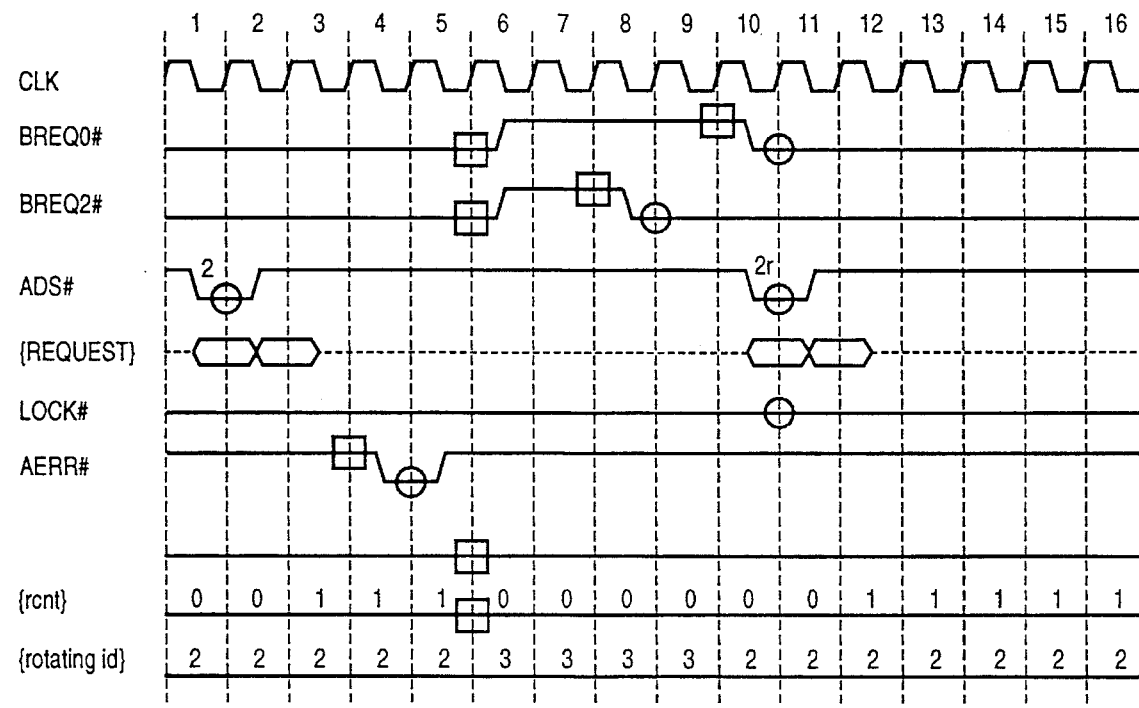
FIG_10

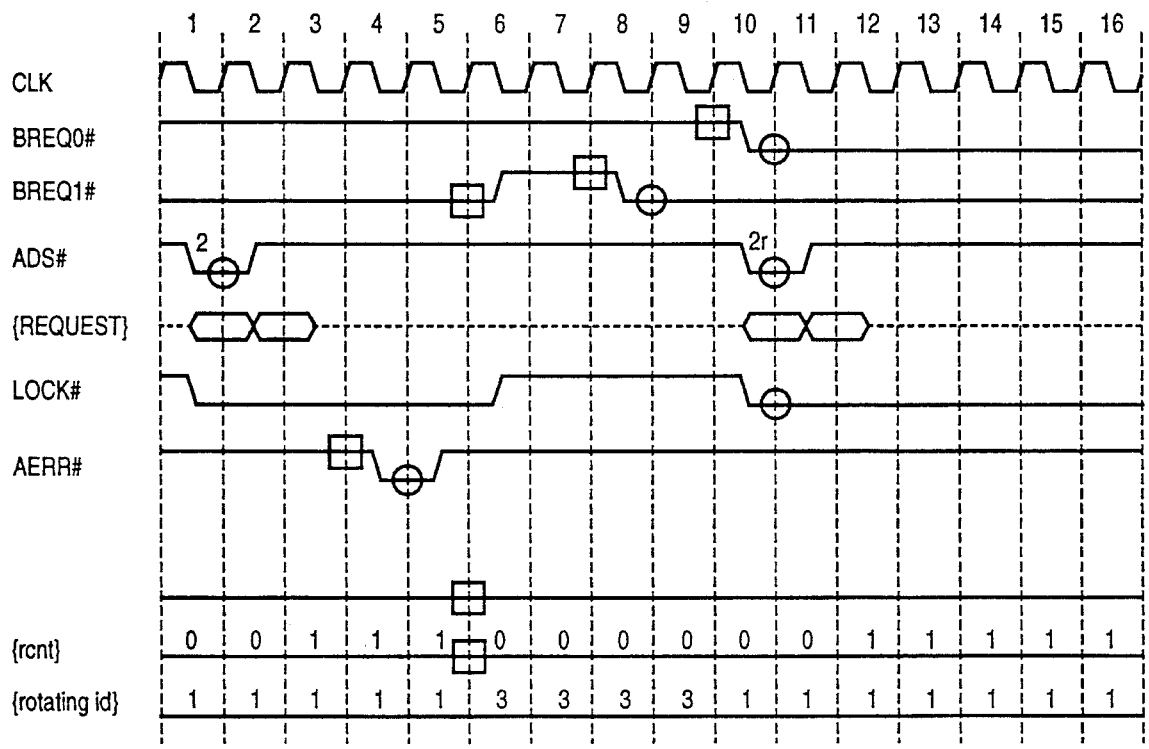
FIG_11
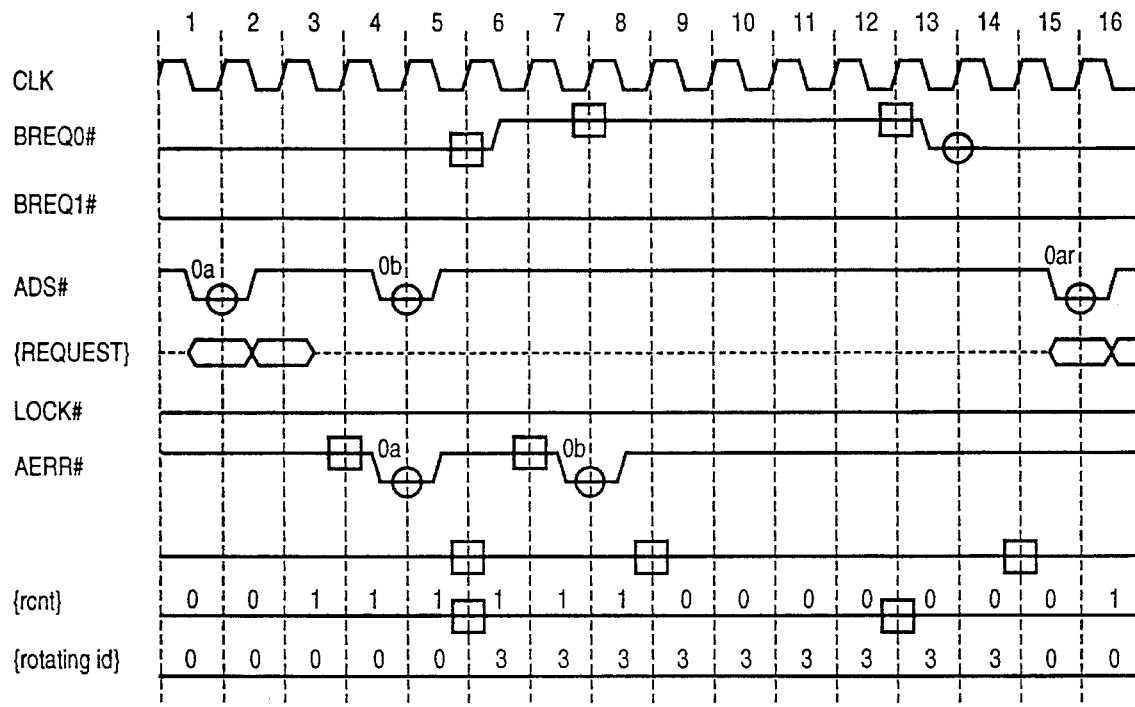
FIG_12

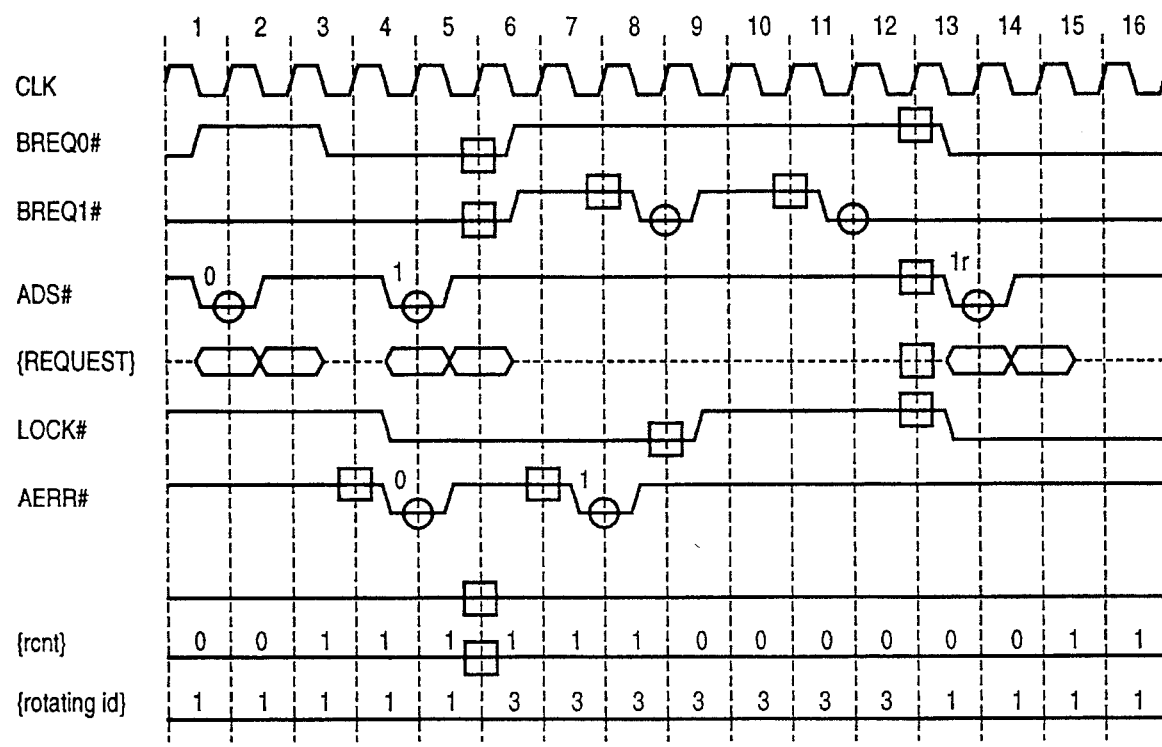
FIG_13

APPARATUS AND METHOD FOR PERFORMING ERROR CORRECTION IN A MULTI-PROCESSOR SYSTEM

FIELD OF THE INVENTION

The present invention pertains to the field of multiprocessor systems. More particularly, the present invention relates to an apparatus and method for performing error correction in a multi-processor environment.

BACKGROUND OF THE INVENTION

A computer system can be broken into three basic blocks: a central processing unit (CPU), memory, and input/output (I/O) units. These blocks are interconnected by means of a bus. An input device such as a keyboard, mouse, disk drive, analog-to-digital converter, etc., is used to input instructions and data to the computer system via the I/O unit. These instructions and data can be stored in memory. The CPU retrieves the data stored in the memory and processes the data as directed by the stored instructions. The results can be stored back into memory or outputted via the I/O unit to an output device such as a printer, cathode-ray tube (CRT) display, digital-to-analog converter, LCD, etc.

In one instance, the CPU consisted of a single semiconductor chip known as a microprocessor. This microprocessor executed the programs stored in the main memory by fetching their instructions, examining them, and then executing them one after another. Due to rapid advances in semiconductor technology, faster, more powerful and flexible microprocessors were developed to meet the demands imposed by ever more sophisticated and complex software.

In some applications, multiple agents (e.g., microprocessors, co-processors, digital signal processors, etc.) are utilized. A singularly complex task can be broken into subtasks. Each subtask is processed individually by a different agent. For example, in a multi-agent computer system, word processing can be performed as follows. One agent can be used to handle the background task of printing a document, while a different agent handles the foreground task of interfacing with a user typing on another document. Thereby, both tasks are handled in a fast, efficient manner. This use of multiple agents allows various tasks or functions to be handled by other than a single CPU so that the computing power of the overall system is enhanced. And depending on the complexity of a particular job, additional agents may be added. Furthermore, utilizing multiple agents has the added advantage that two or more agents may share the same data stored within the system.

Typically, agents on a bus initiate transactions by driving valid lines on an address and request signal group, along with a strobe indicating the beginning of a new transaction. However, these signals are sometimes corrupted by "soft" errors. Hence, the address, request, and strobe signals are often protected by using one or more parity bits to detect these errors. If a parity error is detected, the agent observing the parity error asserts an error indication and that signal is then retried. On retry, most soft errors are eliminated, thereby increasing the system availability.

In addition to addressing errors, there might also be arbitration errors. Typically, any agent desirous of issuing a new bus transaction must first successfully complete an arbitration phase before it is allowed to issue that new bus transaction. In other words, before an agent is allowed to perform a transaction (e.g., a read or a write operation), it must be granted access to the shared bus (i.e., granted bus ownership). In a distributed arbitration scheme, each requesting agent has an arbitration signal that it uses to arbitrate for ownership of the bus. Given such a distributed arbitration scheme, parity protection on the arbitration signals is signal intensive. Each arbitration signal needs one parity signal coverage. Thereby, arbitration errors are protected under the request error detection and retry mechanism.

However, an arbitration signal failure might result in more than one agent determining itself to be the new bus owner. If these multiple agents issue a new bus transaction at different times, it may be detected by the other agents as a protocol violation. But when the requests are issued exactly at the same time, a problem arises in that a common strobe with a different request or address encoding might cause a request or address parity error. This problem is especially troublesome because the same problem might be repeated on retry. In other words, the retry will recreate the same conditions leading to the exact same error being committed again.

Another problem pertains to how locked sequence atomicity is managed. Lock semantics are often used by multiple agents to determine ownership of a shared bus. For example, a first processor may establish a data structure in a memory device for a second processor to read at some future time. The data structure has a flag, or "lock" variable, which is initially reset by the first processor. The lock variable is then set by the first processor after the data structure is established. By monitoring the lock variable, the second processor is capable of determining whether it may safely access the data structure and avoid reading stale data.

A situation may also arise whereby multiple agents desire access to the same data structure. If the data structure can be read from and written to, a mechanism is needed to ensure that only one of the agents can access the data structure at any given time. This can be achieved by using the lock variable to inform the respective agents as to whether the data structure is currently in use. Hence, an agent must first acquire the lock in order to acces the data structure.

The complication lies in that an arbitration failure might occur in the middle of a lock sequence. After an arbitration retry, the same agent is not guaranteed to immediately regain ownership of the bus. Further complicating matters is the fact that once a lock sequence is initiated, it is necessary to complete the entire lock operation in order to preserve the atomicity of the lock variable. An "atomic" operation is defined as an operation consisting of multiple transactions which must be processed on the bus without interruption by another agent. For example, an acquire lock operation must be allowed to read the lock variable and write the lock variable without a second processor performing a read or write operation in the meantime. Allowing a second agent to interfere with the first processor's lock operation might result in both agents believing that they had access to the data structure, which would destroy the purpose of the lock variable. Furthermore, these problems are even more complicated when applied to agents having a pipelined bus architecture, wherein locked and unlocked transactions are simultaneously progressing through the various pipe stages.

Thus, there is a need for an apparatus and method of handling address and request errors in a multi-processor system. It would be preferable if such an apparatus and method also provides protection for arbitration signals. It would also be highly preferable if such an apparatus and method could maintain lock atomicity.

SUMMARY OF THE INVENTION

The present invention pertains to an apparatus and method for performing error correction in a multi-processor system.

In the currently preferred embodiment, processors initiate transactions by driving valid signals on the address and request signal group, along with a strobe indicating beginning of a new transaction. The address, request, and strobe signals are protected by parity bits. If a parity error is detected, the processor observing the parity error asserts an error indication. When an error assertion is observed on the bus, the corresponding transaction is aborted, and the state associated with the transaction is removed from the various bus queues. No destructive state change (with respect to correctness) is allowed to occur inside any bus agent until a transaction completes the error phase error-free. This approach ensures that the original requesting agent may retry the transaction any number of times until the transaction successfully completes.

But before a processor is allowed to issue a new bus transaction, it must first successfully complete an arbitration process. The memory-system bus supports distributed arbitration. An error could result in more than one agent determining itself to be the new bus owner. If the new owners issue a new bus transaction at different times, it may be detected by the other agents as a protocol violation. But when the requests are issued exactly at the same time, the result would be a common strobe with a different request or address encoding, which will result in a request or address parity error. When this error is detected, it is necessary to clear the error. Otherwise, the exact same error will be repeated on retry. Hence, after a request error detection, all symmetric processors are forced to perform an arbitration re-synchronization. The protocol requires all agents to reset the identifier that tracks the priority for bus ownership to be reset to the power-on-state. In other words, all processors first de-assert their bus requests and then re-assert them again to re-arbitrate for the bus. This allows any previous arbitration errors to be cleared and eliminates any possibility of the automatic retry failure resulting from the same error.

During the arbitration re-synchronization, one special boundary condition needs to be properly handled. This is associated with an arbitration failure in the middle of a lock sequence. Once a lock sequence is initiated, it is necessary to complete the entire lock operation to persevere the atomicity of the lock variable. In order to avoid losing the bus ownership to some other agent, the lock owner is given the permission to arbitrate for the bus a few clocks ahead of all other agents. Thus, through natural re-arbitration, the lock agent is the one that is assured to be the new bus owner. This assures the atomicity of the remaining lock operation.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows the computer system upon which a preferred embodiment of the present invention is implemented.

FIG. 2 shows a block diagram illustrating an exemplary processor incorporating the teachings of the present invention.

FIG. 4 is a block diagram showing a bus cluster system upon which the present invention may be practiced.

FIG. 5 shows a flowchart describing the steps for performing request signal protection and request retry.

FIG. 6 shows a flowchart describing the steps for maintaining locked sequence atomicity for a parity error retry procedure.

FIG. 7 illustrates a timing diagram for a request error and its corresponding retry.

FIG. 8 illustrates a timing diagram describing how retrying a transaction can re-order the sequence in which non-order dependent transaction are completed.

FIG. 9 illustrates a timing diagram for a request error wherein the LOCK# signal active for a subsequent transaction.

FIG. 10 illustrates a timing diagram relating to an error condition detected in the middle of a locked operation.

FIG. 11 illustrates a timing diagram relating to an error condition detected on the first transaction of a locked request.

FIG. 12 illustrates a timing diagram for back-to-back request errors wherein LOCK# is inactive.

FIG. 13 illustrates a timing diagram for back-to-back request errors wherein LOCK# is active on the second request.

DETAILED DESCRIPTION

Figure 3:
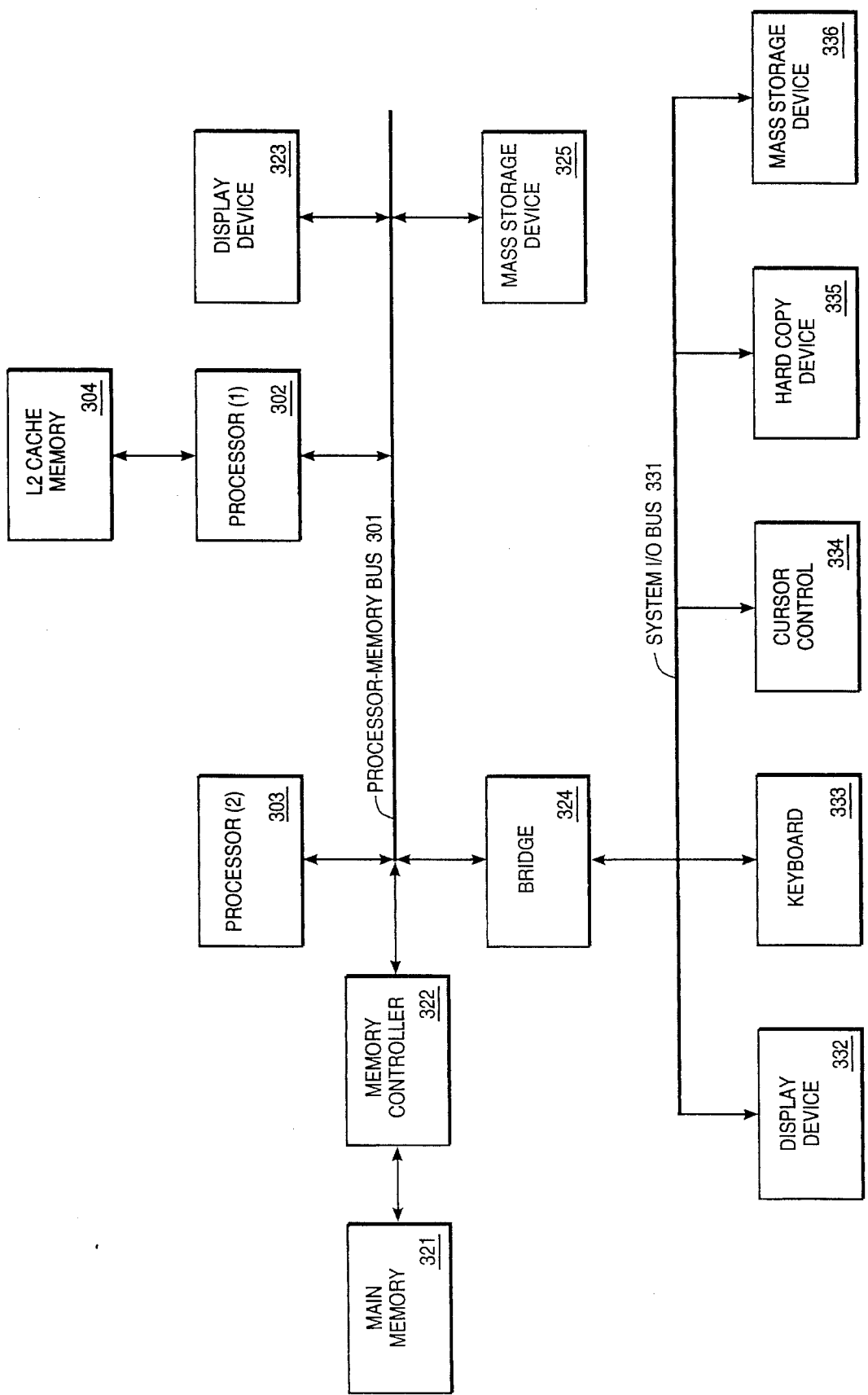
FIG. 3 shows an overview of a multiprocessor computer system upon which the present invention may be practiced.

An apparatus and method for address error correction in a multi-agent system is described. In the following description, for purposes of explanation, numerous specific details are set forth, such as processor configurations, bus architectures, component hierarchies, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Referring to FIG. 1, the computer system upon which a preferred embodiment of the present invention is implemented is shown as 100. Computer system 100 comprises a bus or other communication means 101 for communicating information, and a processing means 102 coupled with bus 101 for processing information. Processor 102 includes, but is not limited to microprocessors such as the Intel™ architecture microprocessors, PowerPC™, Alpha™, etc. Additional numbers of processors, such as processor 103, may also be coupled to bus 101. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102 and an IO bridge 108 to interface to an IO bus 120. A number of standard IO devices may in turn be interfaced to IO bus 120. Computer system 100 also comprises of a read only memory (ROM) 126 coupled to bus 101 for storing non-volatile information and instructions for processor 102, and a data storage device 127 such as a magnetic disk or optical disk and its corresponding disk drive. Data storage device 107 is coupled to bus 101 for storing information and instructions.

Computer system 100 may further be coupled to a display device 121, such as a cathode ray tube (CRT) or liquid crystal display (LCD) coupled to bus 120 for displaying information to a computer user. An alphanumeric input device 122, including alphanumeric and other keys, may also be coupled to bus 120 for communicating information and command selections to processor 102. An additional user input device is cursor control 123, such as a mouse, a trackball, stylus, or cursor direction keys, coupled to bus 120 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Furthermore, a sound recording and playback device, such as a speaker and microphone may optionally be coupled to bus 120 for interfacing with computer system 100. Note that any or all of the components of system 100 and associated hardware may be used in a preferred embodiment, however, it can be appreciated that any type of configuration of the system may be used for various purposes as the user requires. Specifically in one approach IO bridge 108 may be eliminated allowing all devices to reside on bus 101.

Referring now to FIG. 2, a block diagram illustrating an exemplary processor 200 incorporating the teachings of the present invention is shown. The exemplary processor 200 comprises an execution unit 201, a bus controller 202, a data cache controller 203, a data cache 204, and an instruction fetch and issue unit 205 with an integrated instruction cache 206. The elements 201-206 are coupled to each other as illustrated. Together they cooperate to fetch, issue, execute, and save execution results of instructions in a pipelined manner.

The instruction fetch and issue unit 205 fetches instructions from instruction cache 206 and on a cache miss from an external memory through the bus controller 202 via an external system bus. Bus controller 202 manages transfers of data between external components and processor 200. In addition, it also manages cache coherency transfers. The instruction fetch and issue unit 205 then issues these instructions to the execution unit 201 in an in-order sequence. Basically, the execution unit 201 performs such functions as add, subtract, logical AND, and integer multiply. Some of these instructions are fetched and issued speculatively. The execution unit 201 holds and executes the integer and floating point instructions when their operand dependencies on execution results of preceding instructions are resolved. This includes those integer and floating point instructions that are speculatively fetched and issued. In similar fashion, the execution unit 201 holds and forwards the load and store instructions to the retirement logic 207.

Retirement logic 207 commits the states of these instructions to whatever permanent architectural state that was designated by the original source code. Load instruction execution requires data from the actual memory location. Hence loads are retired only after the data becomes available from the local buffers, caches or memory as necessary. However, store instruction execution does not have the limitation. As a result stores are retired immediately and thereupon the retired instructions are sent to the in-order queue 208.

In order to track transactions, all bus agents must track certain transaction information. The transaction information that must be tracked by each bus agent includes: the number of transactions outstanding; what transaction is next to be snooped; what transaction is next to receive a response; and if the transaction was issued to or from this agent.

This information is tracked in the In-order Queue (IOQ) 208. All bus agents maintain identical In-order Queue status to track every transaction that is issued to the bus. When a transaction is issued to the bus, it is also entered in the IOQ of each agent. The depth of the smallest IOQ is the limit of how many transactions can be outstanding on the bus simultaneously. Because transactions receive their responses and data in the same order as they were issued, the transaction at the top of the IOQ is the next transaction to enter the Response and Data Phases (the different phases are described in detail below). A transaction is removed from the IOQ after the Response Phase is complete or after an error is detected in the Error Phase. The simplest bus agents can simply count events rather than implement a queue.

Data cache controller 203 controls the access of data to/from the data cache 204. Data cache 204 is a fast, small, hardware-maintained scratchpad memory which can be reached in fewer clock cycles than main memory by loads and stores. The execution unit forwards lead instructions immediately to the data cache controller 203 and the data cache 204. This is because a load instruction cannot retire until the data is available from the cache or memory subsystem. In contrast, store instructions are buffered. In other words, memory references are not necessarily forwarded in the order they were issued. Moreover, some memory lead references are forwarded due to speculative execution of instructions. In any case, the execution results of the integer, floating point, and lead instructions are buffered, and then retired or committed in order. In comparison, the buffered store instructions are retired or committed in order and then executed in the "background," at the convenience of the memory system. Speculative integer, floating point, and load execution results and buffered stores of mis-predicted branches are purged.

The instruction fetch and execution unit 205 is intended to represent a broad category of instruction fetching and issuing elements found in many computer systems. Their constitutions and functions are well known and will not be further described. In the presently preferred embodiment, the instruction fetch and issue unit 205 includes an instruction cache 206. The instruction cache 206 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 205 to decide which instruction cache entry ought to be accessed next for maximal program performance. In the currently preferred embodiment, the instruction cache 206 and data cache 204 exists in a memory hierarchy.

The hierarchy is comprised of a small but extremely fast L1 cache. If a memory access to the L1 cache results in a miss, the access is passed on to a bigger, but slower, L2 cache. And if that also results in a miss, the memory access goes to the L3 cache or to the main memory if the processor happens to not have an L3 cache. The data cache controller 203 is used for page miss handling. Furthermore, there is no requirement for the instructions to be fetched from aligned memory locations. In other words, an instruction may be fetched from memory locations spanning two cache lines. However, it will be appreciated that the present invention may be practiced with or without an instruction cache, or with a combined instruction/data cache. If an instruction cache is implemented, page misses may be handled by a dedicated page miss handler, and instructions may be fetched from aligned memory locations.

In the currently preferred embodiment, instruction cache 206 is a read only cache. Writes to cache 206 are rare. They need to be correctly handled but are not performance critical. The data cache 204, and cache controller 203 utilize a writeback configuration with M.E.S.I. protocol. The M.E.S.I. (Modified, Exclusive, Shared, or Invalid) protocol depends upon having a shared system bus 210. Furthermore, cache controller 203 must have the ability to: use the same line size for all caches on the memory bus; observe all memory bus activity; maintain state information about every line of cache memory; and take appropriate action to maintain consistency. The M.E.S.I. protocol is implemented by assigning state bits for each cached line. These states are dependent upon both data transfer activities performed by the local processor as the bus master, and snooping activities performed in response to transactions generated by other bus masters.

FIG. 3 shows an overview of a multiprocessor computer system upon which the present invention may be practiced. The computer system generally comprises a processor-system bus or other communication means 301 for communicating information between one or more processors 302 and 303. Processors 302 and 303 can be of a form as shown in FIG. 1. Processor-system bus 301 includes address, data and control buses. As described above, processors 302 and 303 may include a small, extremely fast internal cache memory, commonly referred to as a level one (L1) cache memory for temporarily storing data and instructions on-chip. In addition, a bigger, slower level two (l2) cache memory 304 can be coupled to processor 302 for temporarily storing data and instructions for use by processor 302. In the currently preferred embodiment, the L1 and L2 cache memories are included in the same chip package as processor 302.

Also coupled to processor-memory bus 301 is processor 303 for processing information in conjunction with processor 302. Processor 303 may comprise a parallel processor, such as a processor similar to or the same as processor 302. Alternatively, processor 303 may comprise a co-processor, such as a digital signal processor. The processor-memory bus 301 provides system access to the memory and input/output (I/O) subsystems. A memory controller 322 is coupled with processor-memory bus 301 for controlling access to a random access memory (RAM) or other dynamic storage device 321 (commonly referred to as a main memory) for storing information and instructions for processor 302 and processor 303. Memory controller 312 maintains a strong order of read and write operations. A mass data storage device 325, such as a magnetic disk and disk drive, for storing information and instructions, and a display device 323, such as a cathode ray tube (CRT), liquid crystal display (LCD), etc., for displaying information to the computer user are coupled to processor memory bus 301.

An input/output (I/O) bridge 324 is coupled to processor memory bus 301 and, system I/O bus 331 to provide a communication path or gateway for devices on either processor memory bus 301 or I/O bus 331 to access or transfer data between devices on the other bus. Essentially, bridge 324 is an interface between the system I/O bus 331 and the processor memory bus 301.

In order to reduce the bandwidth requirement, bridge 324 turns the byte/word/dword data transfer traffic from I/O bus 331 into line size traffic on processor memory bus 301. I/O bus 331 communicates information between peripheral devices in the computer system. Devices that may be coupled to system bus 331 include a display device 332, such as a cathode ray tube, liquid crystal display, etc., an alphanumeric input device 333 including alphanumeric and other keys, etc., for communicating information and command selections to other devices in the computer system (e.g., processor 302) and a cursor control device 334 for controlling cursor movement. Moreover, a hard copy device 335, such as a plotter or printer, for providing a visual representation of the computer images and a mass storage device 336, such as a magnetic disk and disk drive, for storing information and instructions may also be coupled to system bus 331. In some implementations, it may not be required to provide a display device for displaying information. Certain implementations of the present invention may include additional processors or other components.

FIG. 4 is a block diagram showing a bus cluster system upon which the present invention may be practiced. The present invention can apply to multiprocessor computer systems having one or more clusters of processors. FIG. 4 shows two such clusters 401 and 402. Each of these clusters are comprised of a number of processors. For example, cluster 401 is comprised of four agents 403–406 and a cache 407. Agents 403–406 can include microprocessors, co-processors, digital signal processors, etc. Cache 407 is shared between these four agents 403–406. Each cluster is coupled to a memory system bus 408. These clusters 401–402 are coupled to various other components of the computer system through a system interface 409. The system interface 409 includes a high speed I/O interface 410 for interfacing the computer system to the outside world and a memory interface 411 which provides access to a main memory, such as a DRAM memory array (these interfaces are described in greater detail in FIG. 3).

In the currently preferred embodiment of the present invention, a processor writes to a cache line in the Exclusive or Modified state line immediately. The final state is then changed to that of Modified. When a processor writes to a line in the Invalid or Shared state, it has two options. First, in a Write-through approach, a write miss creates a partial write transaction from the agent writing the data. If the processor contains the data in the Invalid state, the caches are not affected. When the transaction runs on the bus, all snooping caches are invalidated. If the processor contains the data in a Shared state, a cache write-through operation is performed, and the partial write transaction is sent on the bus. The partial write invalidates the line in other snooping caches. On successful completion of the transaction, the original agent goes to the Exclusive state and subsequently begins updating the cache internally. When multiple writeback agents perform a write transaction to the same cache line, only the data in the main memory contains valid data because if each agent performs a write-through, there are two copies of the line in the Shared state that contain different data. Hence, the lines inside the respective caches are invalidated.

In the second approach, a write-allocation operation is performed. When the line is in an Invalid state, the processor performs a Bus-Read-Invalidate transaction. A Bus-Read-Invalidate transaction indicates that a requesting processor has had a read miss and intends to modify that cache line when the line is returned. This transaction invalidates the cache line in all other caches and brings the line back to the Exclusive state in the requesting processor. If the line is in the Shared state, the processor performs a bus-write-invalidation transaction. A bus-write-invalidation transaction indicates that a requesting processor contains the cache line in the shared state and intends to modify the line. In the case of a race condition, the response to this transaction may contain data. This bus-write-invalidation transaction invalidates the cache line in all other caches and all the Shared states to go to the Exclusive state in the requesting processor. Only after the Exclusive state has been updated, is the processor allowed to update its cache date and upgrade itself to the Modified state. Note that since the data update does not happen until the processor is in the Exclusive state, it is assured that only one processor will be updating the cache data at any given time.

When two processors on the same cluster initiate a Bus-Write-Invalidate transaction at the same time, it is necessary to resolve the race condition. In one embodiment, the present invention resolves race conditions by NACKing the second write invalidation request while the first invalidation request is progressing. This embodiment requires the second agent to reissue its request. The NACK may either be generated by the first agent or by the memory controller responsible for handling the bus transaction in the absence of the race condition.

In currently preferred embodiment, both invalidation requests are allowed to continue on the bus. However, only the first invalidation request that first appeared on the bus is simply allowed to complete with no need of a data transfer. Thereupon, the first processor goes to the Exclusive state, updates the cache line, and then goes to the Modified state. Upon observing the second invalidation request, the first processor asserts the snoop results indicating that it contains the line in a Modified state. This requires the transaction completion to be altered and it includes a data transfer phase. (Note that the second processor contained the line in Shared State and was not expecting any data.) During the data transfer phase the first processor writes back the notified cache line on the bus and then goes to the Invalid state. The second processor which normally expects a completion response to a bus-invalidation request, now receives a new cache line. The second processor updates its cache to the new cache line and then goes to the Exclusive state. Thereupon, the second processor can write its data to the Exclusive state line and change to the Modified state. Note that this approach can be readily applied if all processors generated invalidation requests on the same bus cluster. The ownership of the cache line is passed from one processor to the next processor.

In an alternative embodiment, instead of issuing the second invalidation transaction, the second processor observes the first bus-write-invalidation transaction. The second processor then assures that it never issues a write-invalidation transaction to the same line. Instead, the second processor converts it to a read-invalidation request and sets the internal state of the line to the Invalid state. However, this alternative embodiment introduces an additional delay in the critical timing path associated with issuing write-invalidation requests on the bus.

A different race condition exists when the first processor issues a partial memory write to the same cache line that the second processor is about to issue a bus-write-invalidation request. The second processor always issues a bus-read-invalidation request instead of the bus-write-invalidation request. This requires memory 222 to return the new line. This is the preferred embodiment.

However, the race condition may also be handled by the memory controller when it detects a partial write transaction followed by a bus-write-invalidation request to the same cache line. In such a case the memory controller may assert a modified line indication during the snoop result phase of the second invalidation transaction and then return the modified line during the data transfer phase of the transaction.

The present invention is applicable to multiple cluster, each of which contains write-back caches. The same approach described above is applied to multiple cluster applications. Two or more processors from different clusters initiate bus-write-invalidation requests to the same cache line. The memory controllers in both clusters assert a snoop result indicating that the ownership of the line is not immediately available. Next, the memory controllers access the system interconnect network. This interconnection can be made through a common bus that may have a different topology. It is given that one of the memory controllers will gain access first. This allows the first transaction to be ready for completion. Thereby, the first memory controller informs the first processor by running a deferred reply with normal completion response. This allows the first processor to upgrade to the Exclusive state, update its cache line, and then go to the Modified state.

When the second memory controller issues its request to the interconnect (e.g., the system bus), it is handled in the presence of a line in the Modified state in a different cluster. As a result, a backward invalidation is first sent to the first cluster/processor to invalidate the line from the processor and to obtain the write-back cache line. This line now contains the updated data. Next, a deferred reply is sent back by the second memory controller to the second processor. During the data phase of the deferred reply, the memory controller returns the new cache line. When the processor obtains a deferred reply with data, it absorbs the cache line in its cache and goes to the Exclusive state. Now, it updates the cache line and changes it to the Modified state. Note that since there is no need to NACK any transaction, there is no possibility of repeated retries and, hence, no resulting livelock scenarios.

Similarly if the first processor from cluster 1 issued a partial write that completes successfully, the second memory controller is required to convert its bus-write-invalidation request to a bus-read-invalidation request to obtain the new data from the memory interface 411.

In the currently preferred embodiment, each bus transaction includes some or all of the following phases. An Arbitration phase is used to determine ownership of the bus amongst the various requesting agents. No transactions can be issued until the bus agent owns the bus. A transaction only needs to have this phase if the agent that wants to drive the transaction does not already own the bus. Note that there is a distinction between a symmetric bus owner and the actual bus owner. The actual bus owner is the one and only bus agent that is allowed to drive a transaction at that time. The symmetric bus owner is the bus owner unless the priority agent owns the bus. A Request phase is the phase in which the transaction is actually issued to the bus. The request agent drives the address strobe signal (ADS#). This signal is asserted by the current bus owner for one clock to indicate a new Request phase. Any errors that occur during the Request phase are reported in the Error phase. All transactions include this phase (1 clock).

A Snoop phase is used to enforce cache coherency. All caching agents (snoop agents) drive snoop-hit (HIT#) and snoop hit-modified (HITM#) signals, which give the snoop results, to the appropriate values during this phase. All memory transactions have this phase. The response agent drives the transaction response during the Response phase. The response agent is the target device addressed during the Request phase, unless a transaction is deferred for later completion. All transactions have this phase. Finally, the response agent drives or accepts the transaction data (if any) in the Data phase.

In the currently preferred embodiment, errors are detected and corrected by implementing request signal protection and request retry. Bus agents on the memory-system bus 408 initiate transactions by driving valid signals on the address and request signal group along with a strobe indicating beginning of a new transaction. The address signals are protected with two parity signals. The request and the strobe signals are protected by a single parity signal. All agents are required to enable parity checking for two clocks on observing an active strobe. If a parity error is detected, the agent observing the parity error asserts an error indication in the next clock.

Whenever an error assertion is observed on the bus, the corresponding transaction is aborted and the state associated with the transaction is removed from the various bus queues. No destructive state change (with respect to correctness) is allowed to occur inside any bus agent until a transaction completes the error phase error-free. This approach ensures that the original requesting agent may retry the transaction any number of times until the transaction can successfully complete the error phase. Various bus agent implementations may actually institute a retry limit. But a minimum of one retry eliminates virtually all soft errors, thereby increasing the system availability.

The arbitration signal protection and arbitration retry mechanism is now described. Any bus agent desirous of issuing a new bus transaction must first successfully complete the Arbitration phase before it is allowed to issue a new bus transaction. The memory-system bus supports distributed arbitration.

The bus arbitration protocol supports two classes of bus agents: symmetric agents and priority agents. The symmetric agents support fair, distributed arbitration using a round-robin algorithm. Each symmetric agent has a unique Agent ID between zero to three assigned at reset. The algorithm arranges the four symmetric agents in a circular order of priority: 0, 1, 2, 3, 0, 1, 2, etc. Each symmetric agent also maintains a common Rotating ID that reflects the symmetric Agent ID with the lowest priority in the next arbitration event (an arbitration event is the process by which a new symmetric bus owner is determined and changed). On every arbitration event, the symmetric agent with the highest priority becomes the symmetric owner. Note that the symmetric owner is not necessarily the overall bus owner. The symmetric owner is allowed to enter the Request Phase provided no other action of higher priority is preventing the use of the bus.

The priority agent(s) has higher priority than the symmetric owner. Once the priority agent arbitrates for the bus, it prevents the symmetric owner from entering into a new Request Phase unless the new transaction is part of an ongoing bus locked operation. The priority agent is allowed to enter the Request Phase provided no other action of higher priority is preventing the use of the bus. The priority agent normally arbitrates on behalf of the I/O and possibly memory subsystems.

Besides the two classes of arbitration agents, each bus agent has two actions available that act as arbitration modifiers: the bus lock and the request stall. The bus lock action is available to the current symmetric owner to block other agents, including the priority agent from acquiring the bus. Typically, a bus locked operation consists of two or more transactions issued on the bus as an indivisible sequence (this is indicated on the bus by the assertion of the LOCK# pin). Once the symmetric bus owner has successfully initiated the first bus locked transaction it continues to issue remaining requests that are part of the same indivisible operation without releasing the bus. The request stall action is available to any bus agent that is unable to accept new bus transactions. By asserting a signal (BNR#) any agent can prevent the current bus owner from issuing new transactions. In the currently preferred embodiment, the are a total of five arbitration signals-one per requesting agent that the agent uses to arbitrate for the bus. All agents observe the five arbitration signals to determine the current bus owner. Given the distributed arbitration scheme, parity protection on arbitration signals is signal intensive. Every arbitration signal requires one parity signal coverage. As a result, the arbitration errors are protected under the request error detection and retry mechanism.

Distributed arbitration signal failures will imply that more than one agent would determine itself to be the new bus owner. If the new owners issue a new bus transaction at different times, it may be detected by the other agents as a protocol violation. But when the requests are issued exactly at the same time the result would be a common strobe with a different request or address encoding which will result in a request or address parity error. When the error is detected by a bus agent, prior to performing a retry, it is necessary to clear the arbitration error. Otherwise, the retry will recreate the exact same error. Hence, in the present invention after request error detection, all symmetric agents are forced to perform an arbitration re-synchronization. The protocol requires all agents to reset the identifier that tracks the priority for bus ownership to be reset to the power-on-state (e.g., the "rotating ID"). All agents first de-assert their bus requests and then re-assert them again to re-arbitrate for the bus. This allows any previous arbitration errors to be cleared and eliminates any possibility of the automatic retry failure due to the same cause.

However, during the arbitration re-synchronization, one special boundary condition needs to be properly handled. This is associated with an arbitration failure in the middle of a lock sequence. Once a lock sequence is initiated it is necessary to complete the entire lock operation to persevere the atomicity of the lock variable. The arbitration re-synchronization has the property by which, due to re-arbitration, it is not guaranteed that the same agent will regain the bus ownership. In order to avoid losing the bus ownership to some other agent, the lock owner is given the permission to arbitrate for the bus a few clocks ahead of all other agents. Thus, through natural re-arbitration, the lock agent is the one that is assured to be the new bus owner. This assures the atomicity of the remaining lock operation.

The actual implementation is as follows. All bus agents observe AERR# assertion and de-assert their arbitration request. This allows arbitration re-synchronization to begin. The agents not involved in a locked transaction must wait for a minimum of four clocks before re-arbitrating for the bus. The bus agents just beginning a lock sequence or in the middle of a lock sequence are given a head-start and are required to wait only for two clocks before re-arbitration. This guarantees that a lock owner will always get higher priority than all other agents. So whenever there is only one lock owner it regains bus ownership.

The AERR# signal is the address parity error signal. Assuming the AERR# driver is enabled during the power-on configuration, a bus agent can drive AERR# active for one clock during the Error phase of a transaction. The AERR# is inactive for a minimum of two clocks. The Error phase is three clocks from the beginning of the Request phase. On observing an active ADS#, all agents begin parity and protocol checks for the signals valid in the two Request phase clocks. Parity is checked on AP[1:0]# and RP# signals. The AP[1:0]# signals are the address parity signals.

They are driven by the request initiator during the two Request covers A[35:24]#. AP0# covers A[23:3]#. A correct parity signal is high if an even number of covered signals are low and low if an odd number of covered signals are low. This bus allows parity to be high when all covered signals are high. All bus agents begin parity checking on observing an active ADS# and determine if there is a parity error. On observing a parity error on any one of the two Request phase clocks, the bus agent asserts AERR# during the Error phase of the transaction. A parity error without a protocol violation is also signaled by a AERR# assertion.

If AERR# observation is enabled during power-on configuration, AERR# assertion in a valid Error Phase aborts the transaction. All bus agents remove the transaction from the In-order Queue and update internal counters. The Snoop Phase, Response Phase, and Data Phase of the transaction are aborted. Specifically if the Snoop Phase associated with the aborted transaction is driven in the next clock, the snoop results, including a stall condition (HIT# and HITM# asserted for one clock), are ignored. All bus agents begin an arbitration reset sequence and de-assert BREQn#/BPRI# arbitration signals on sampling AERR# active. A current bus owner in the middle of a bus lock operation must keep LOCK# asserted and assert its arbitration request BPRI#/BREQn# after keeping it inactive for two clocks to retain its bus ownership and guarantee lock atomicity. All other agents, including the current bus owner not in the middle of a bus lock operation, must wait at least 4 clocks before asserting BPRI#/BREQn# and beginning a new arbitration.

The BPRI# signal is the Priority-agent Bus Request signal. The priority agent arbitrates for the bus by asserting BPRI#. The priority agent is the next bus owner. Observing BPRI# active causes the current symmetric owner to stop issuing new requests, unless such requests are part of an ongoing locked operation. If LOCK# is sampled inactive two clocks from BPRI# driven asserted, the priority agent can issue a new request within four clocks of asserting BPRI#. The priority agent can further reduce its arbitration latency to two clocks if it samples active ADS# and inactive LOCK# on the clock in which BPRI# was driven active and to three clocks if it samples active ADS# and inactive LOCK# on the clock in which BPRI# was sampled active. If LOCK# is sampled active, the priority agent must wait for LOCK# de-asserted and gains bus ownership in two clocks after LOCK# is sampled de-asserted. The priority agent can keep BPRI# asserted until all of its requests are completed anti can release the bus by de-asserting BPRI# as early as the same clock edge on which it issues the last request.

The LOCK# signal is the Arbitration group bus lock signal. For a locked sequence of transactions, LOCK# is asserted from the first transaction's Request Phase through the last transaction's Response Phase. A locked operation can be prematurely aborted (and LOCK# de-asserted) if AERR# is asserted during the first bus transaction of the sequence. The sequence can also be prematurely aborted if a hard error (such as a hard failure response or AERR# assertion beyond the retry limit) occurs on any one of the transactions during the locked operation.

When the priority agent asserts BPRI# to arbitrate for bus ownership, it waits until it observes LOCK# de-asserted. This enables symmetric agents to retain bus ownership throughout the bus locked operation and guarantee the atomicity of lock. If AERR# is asserted up to the retry limit during an ongoing locked operation, the arbitration protocol ensures that the lock owner receives the bus ownership after arbitration logic is reset. This result is accomplished by requiring the lock owner to reactivate its arbitration request at least one clock ahead of other agents' arbitration request. LOCK# is kept asserted throughout the arbitration reset sequence.

On observation of active AERR#, RESET#, or BINIT#, BPRI# is de-asserted in the next clock. Asserting RESET# resets all agents to known states. The BINIT# signal is the bus initialization signal. BPRI# can be re-asserted in the clock after sampling the RESET# active-to-inactive transition or three clocks after sampling BINIT# active and RESET# inactive. On AERR# assertion, if the priority agent is in the middle of a bus-locked operation, BPRI# is re-asserted after two clocks. Otherwise, BPRI# stays inactive for at least 4 clocks.

After the RESET# inactive transition, P6 bus agents begin BPRI# and BNR# sampling on BNR# sample points. The BNR# signal is the Block Next Request signal in the Arbitration group. The BNR# signal is used to assert a bus stall by any bus agent who is unable to accept new bus transactions to avoid an internal transaction queue overflow. During a bus stall, the current bus owner cannot issue any new transactions. When both BNR# and BPRI# are observed inactive on a BNR# sampling point, the APIC units in P6 processors on a common APIC bus are synchronized. In a system with multiple P6 bus clusters sharing a common APIC bus, BPRI# signals of all clusters must be asserted after RESET# until BNR# is observed inactive on a BNR# sampling point. The BPRI# signal on all P6 buses must then be de-asserted within 100 ns of each other to accomplish APIC bus synchronization across all processors.

The BREQ[3:0]# signals are the Symmetric-agent Arbitration Bus signals (called bus request). A symmetric agent n arbitrates for the bus by asserting its BREQn# signal. Agent n drives BREQn# as an output and receives the remaining BREQ[3:0]# signals as inputs.

The symmetric agents support distributed arbitration based on a round-robin mechanism. The rotating ID is an internal state used by all symmetric agents to track the agent with the lowest priority at the next arbitration event. At power-on, the rotating ID is initialized to three, allowing agent 0 to be the highest priority symmetric agent. After a new arbitration event, the rotating ID of all symmetric agents is updated to the agent ID of the symmetric owner. This update gives the new symmetric owner lowest priority in the next arbitration event.

A new arbitration event occurs either when a symmetric agent asserts its BREQn# on an Idle bus (all BREQ[3:0]# previously inactive), or the current symmetric owner de-asserts BREQm# to release the bus ownership to a new bus owner n. On a new arbitration event, based on BREQ[3:0]#, and the rotating ID, all symmetric agents simultaneously determine the new symmetric owner. The symmetric owner can park on the bus (hold the bus) provided that no other symmetric agent is requesting its use. The symmetric owner parks by keeping its BREQn# signal active. 0n sampling active BREQm# asserted by another symmetric agent, the syrmnetric owner de-asserts BREQn# as soon as possible to release the bus. A symmetric owner stops issuing new requests that are not part of an existing locked operation upon observing BPRI# active.

A symmetric agent can not de-assert BREQn# until it becomes a symmetric owner. A symmetric agent can re-assert BREQn# after keeping it inactive for one clock. On observation of active AERR#, the BREQ[3:0]#signals are de-asserted in the next clock. On AERR# assertion, if bus agent n is in the middle of a bus-locked operation, BREQn# must be re-asserted after two clocks, otherwise BREQ[3:0]# stays inactive for at least 4 clocks.

If AERR# observation is enabled, the request initiator can retry the transaction up to n times until it reaches the retry limit defined by its implementation. If AERR# observation is disabled during power-on configuration, AERR# assertion is ignored by all bus agents except a central agent.

As a boundary condition, it is possible that multiple agents may begin their first locked sequence together due to arbitration failure. After this error is recognized due to AERR# observation the protocol requires that these agents de-assert LOCK# along with their de-assertion of arbitration request. The agents go through arbitration ID synchronization. If multiple agents re-arbitrate exactly after two clocks only one agent is guaranteed to win due to the distributed arbitration protocol. Only the new bus owner is allowed to begin a new lock operation. This guarantees that by the time any agent issues its second lock transaction it is the only lock agent arbitrating for the bus. As a result, an agent in the middle of the lock sequence always has a two clock headstart above other bus agents arbitrating for the bus. This guarantees that it always regains bus ownership. Hence, lock sequence atomicity is maintained.

Lock atomicity management during back-to-back transaction requests is now described. For agents having pipelined bus architectures, a maximum transaction issue rate at one every three clocks is possible. Thus, boundary conditions associated with arbitration management for the second transaction must also be supported. If the original transaction receiving AERR# was a locked transaction, it is guaranteed that there is no pipelined transaction. Hence, these boundary conditions do not exist. If the original transaction receiving AERR# is a non-locked transaction a pipelined transaction behind it may be a locked or unlocked transaction. A pipelined unlocked transaction owner re-arbitrates as required, while the transaction that just issued is allowed to continue. Since there is no special requirement, it may or may not win the bus after the four clock arbitration wait period. However, a pipelined lock transaction owner must regain the bus back after the arbitration re-synchronization. In order to accomplish this, it keeps LOCK# asserted and re-asserts its arbitration request in two clocks. If it is the only agent asserting bus request in two clocks, then it is always guaranteed bus ownership. If there are more than one agents competing at this point, they all issue overlapped transactions. This causes a second AERR#. This is then handled as the recovery scenario described above with respect to the locked sequence atomicity management. Thus, in the present invention, lock atomicity is always guaranteed under all possible worst case boundary conditions encountered in a pipelined bus.

FIG. 5 shows a flowchart describing the steps for performing request signal protection and request retry. Initially, parity bits are generated for the address, request, and strobe signals, step 501. These parity bits are checked to determine whether there has been a soft error, step 502. If there are no parity errors, the transaction is allowed to complete, step 508. However, if an error is detected, an error indication is asserted, step 503. The transaction is then aborted, step 504. The transaction's state is removed from the bus queues, step 505. However, there is no destructive state change. This allows the original requesting agent to retry that transaction one or more times, step 506. On retry, the parity is checked again, step 507. If there is no error on retry, the transaction is allowed to complete, step 508. Otherwise, steps 503–506 are repeated for successive retry attempts.

FIG. 6 shows a flowchart describing the steps for maintaining locked sequence atomicity for a parity error retry procedure. Before a new bus transaction is allowed to issue by a bus agent, it must get ownership of the bus during the arbitration process, steps 601 and 602. During the error phase, the request parity bits are checked to determine whether there has been an arbitration failure, step 604. If no failures are detected, the arbitration phase completes, step 605.

Otherwise, an arbitration failure indicates that more than one agent might believe that it has ownership of the bus. A determination is made as to whether these new bus owners issue transactions at different times, step 606. If they did issue transactions at different times, the other agents will detect a protocol violation, step 607. This indicates that an arbitration error had occurred. Thereupon, the arbitration process is retried, step 608. However, if the transactions occur at the same time, a determination is made as to whether the arbitration failure occurred in the middle of a lock sequence, step 609. If a lock sequence is not involved in the arbitration failure, the arbitration error is cleared, and an arbitration re-synchronization procedure is initiated, step 611. Otherwise, if the arbitration failure does involve a lock sequence, the lock owner is allowed to arbitrate for the bus ahead of all the other agents, step 610. Thereby, the lock owner always regains bus ownership after an arbitration re-synchronization, and lock atomicity is maintained.

FIG. 7 illustrates a timing diagram for a request error and its corresponding retry. The square and circle symbols are used in the timing diagrams to indicate the clock in which particular signals of interest are driven and sampled. The square indicates that a signal is driven (asserted, initiated) in that clock. The circle indicates that a signal is sampled (observed, latched) in that clock. If AERR# observation is enabled at reset, the transaction is removed from the bus just like it was never issued. After re-arbitrating for the bus, the transaction is retried.

Agent 1 drives request 2 during T1. Another agent detects a transmission error in T2 or T3 and because AERR# drive was enabled at reset, asserts AERR# in T4. Because AERR# observation was enabled at reset, the assertion of AERR# cancels request 2. In addition, the bus arbitration is reset and the transaction is removed from the In-order Queue. An internal request count, {rcnt}, is maintained by bus agents to track the number of transactions outstanding on the bus. The {rcnt} state is incremented by one when a new transaction enters the Request Phase. The {rcnt} state is decremented by one when an outstanding transaction completes the Response Phase or is aborted in the Error Phase. The {rcnt} state is initialized to zero during reset and bus initialization (BINIT#) and can take values from zero to eight (corresponding to the number of transactions outstanding on the bus). In T6, the clock after AERR# was observed active, the Rotating ID is reset to 3 and the {rcnt} is decremented by 1. The snoop result available in T5 is ignored by all agents. Agent 1 de-asserts BREC1# in T6 and re-asserts BREQ1# in T10 (keeping BREQ# de-asserted for four clocks.). Because Agent 1 is the only agent seeking the bus, it owns the bus starting in T12. Agent 1 then reissues request 2r (transaction 2 retry) in T12.

FIG. 8 illustrates a timing diagram describing how retrying a transaction can re-order the sequence in which non-order dependent transaction are completed.

In T4, AERR# is asserted to indicate that an error was detected on transaction 1a driven in T1 by agent 1. Agent 1 issued an order-independent new Request 1b, in T4. Because AERR# observation was enabled at reset, AERR# activation in T4 cancels request 1A. Request 1b continues progress.

All symmetric agents observe AERR# active in TS and reset their rotating Agent ID to 3 in T6. The {rcnt} does not change value in T6 because the removal of transaction 1a from the bus is counteracted by transaction 1b being issued to the bus in the same dock. Agent 1, the requesting agent, de-asserts BREQ1# in T6 and re-asserts it 4 clocks later in T10. After becoming request bus owner again in T12, agent 1 reissues request 1ar (transaction 1a retry) in T12. Note that request 1b is reordered on the bus with respect to request 1a in comparison to its original order and could be issued as late as T6.

FIG. 9 illustrates a timing diagram for a request error wherein the LOCK# signal active for a subsequent transaction. If AERR# observation is enabled at reset, the transaction that caused the error is removed from the bus as if it was never issued.

Prior to T1, agent 1 is the symmetric bus owner. In T1, agent 1 drives request 1 and de-asserts its BREQ1# signal due to an active BREQ2#. Agent 2 becomes the bus owner in T3. Another agent detects a transmission error in T2 or T3 and asserts AERR# in T4.

Since AERR# observation was enabled at reset, the assertion f AERR# cancels request 1. Therefore, the bus arbitration is reset and transaction 1 is removed from the In-order Queue. In T6, the Rotating ID is reset to 3, the {rcnt} is decremented by 1. The snoop result available in T5 is ignored by all agents.

In T6, agent 2 begins a new locked operation and drives ADS# and LOCK# active. Due to AERR# observation, agent 2 de-asserts BREQ2# bus leaves LOCK# asserted for request 2a. In order to regain bus ownership during the lock operation, agent 2 re-asserts BREQ2# in T8 (keeping BREQ# de-asserted for only two clocks.) Because agent 2 is the only agent seeking the bus, it owns the bus starting in T10. Agent 1 is not allowed to assert BREQ1# until T10 to attempt to retry transaction 1. Note that transaction 1 cannot be retried until agent 2 has de-asserted LOCK#.

FIG. 10 illustrates a timing diagram relating to an error condition detected in the middle of a locked operation. Thus bus owner in the middle of a locked operation always regains bus ownership by the arbitration protocol, therefor the atomicity of locked operations is guaranteed.

Before T1, agent 2 owns the request bus and is in the middle of an indivisible lock operation, as indicated by LOCK# active. Agent 0 is seeking the bus by assertion BREQ0# and is waiting for BREQ# inactive. Agent 2 drives request 2 in T1. AERR# is asserted in T4, canceling request 2. All agents observe AFRR# active in T5 and de-assert their bus request signals in T6. Also in T6, all agents reset their rotating Agent ID to 3 and decrement {rcnt}. LOCK# remains asserted. In T8, agent 2, the request bus owner during the locked operation, asserts BREQ2# after keeping it de-asserted for 2 clocks. In T9, BREQ2# is the only active bus request signal. In T10, agent 2 becomes the symmetric bus owner. In T10 (after keeping BREQ0# inactive for four clocks), agent 0 asserts BRFQ0# to seek request bus ownership, bus agent 2 has already become the symmetric bus owner. In T10, agent 2 reissues request 2r.

FIG. 11 illustrates a timing diagram relating to an error condition detected on the first transaction of a locked request. If AERR# observation is enabled at reset, the entire locked transaction is removed from the bus and the locked operation is restarted at a later time.

Agent 1 begins a new lock operation and drives ADS# and LOCK# active 2 during T1. Another agent detects a transmission error in T2 or T3 and because AERR# drive was enabled at rest, asserts AERR# in T4. Because AERR# observation was enabled at reset and request 2 is the first transaction of the locked sequence. The assertion of AERR# cancels request 2. The bus arbitration is reset and the transaction is removed from the In-order Queue. In T6, the clock after AERR# was observed active, the Rotating ID is reset to 3 and the {rcnt} is decremented by 1. The snoop result available in T5 is ignored by all agents. Agent 1 de-asserts BREQ1# and LOCK# in T6 and re-asserts BREQ1# in T8. This is the earliest clock in which agent 1 is allowed to re-assert BREQ1#. However, agent 1 may delay BREQ1# assertion for greater than two clock since it was not in the middle of a locked operation. Because agent 1 is the only agent seeking the bus, it owns the bus starting in T10 and then reissues the locked request 2r (transaction 2 retry) in T10.

FIG. 12 illustrates a timing diagram for back-to-back request errors wherein LOCK# is inactive. If AERR# observation is enabled at reset, the transactions are removed from the bus just like they were never issued. After re-arbitrating for the bus, the transactions are retried.

Agent 0 drives request 0a during T1. Another agent detects a transmission error in T2 or T3 and asserts AERR# in T4. In T4, agent 0 drives request 0b. A transmission error is detected with request 0b and AERR# is driven by another agent in T7. Since AERR# observation was enabled at reset, the assertion of AERR# during the respective AERR# window cancels both requests. The bus arbitration is reset and the transactions are removed from the In-order Queue. In T6, the clock after AERR# was observed active, the Rotating ID is reset to 3 and the {rent} is decremented by 1. The snoop result available in TS is ignored by all agents. Agent 0 de-asserts BREQ0# in T6 and due to the back-to-back assertion of AERR#, cannot re-assert BREQ0# until T12 (keeping BREQ# de-asserted for five clocks after the second AERR#, cannot re-assert BRE0# until T12 (keeping BREQ# de-asserted for five clocks after the second AERR#). Because Agent 0 is the only agent seeking the bus, it owns the bus starting in T14. Agent 0 then reissues request 0ar or 0br (transaction 0a or 0b retry) in T15.

FIG. 13 illustrates a timing diagram for back-to-back request errors wherein LOCK# is active on the second request. This further illustrates how retrying a transaction can re-order the sequence in which non-order dependent transaction are completed.

Before T1, agent 0 owns the request bus. Agent 1 is seeking the bus by asserting BREQ1# and is waiting for BREQ0# inactive. In T1, agent 0 issues request 0 de-asserts BREQ0# relinquishing the bus to agent 1. In T4, agent 1 issues locked request 1. Another agent detects a transmission error with request 0 and asserts AERR# in T4. In T7 another agent asserts AERR# after detecting a transmission error with locked request 1.

All symmetric agents observe AERR# active in T5 and reset their rotating Agent ID to 3 in T6. The {rcnt} does not change value in T6 because the removal of transaction 0 from the bus is counteracted by transaction 1 being issued to the bus in the same clock. Agent 1 de-asserts BREQ1# in T6 re-asserts it 2 clocks later in T8 due to its assertion of LOCK#. The second AERR# causes agent 1 to de-assert both BREQ1# and LOCK# (associated with request 1 ) in T9 Agent I re-asserts BREQ1#in two clocks in T11. Because agent 1 is the only agent seeking the bus in T12, it gains bus ownership starting in T13 and then reissues locked request 1r (transaction1 retry). Agent 0 is allowed to re-assert BREQ0# in T13 and wait until BREQ1# is de-asserted.

If "AERR# drive" is enabled during power-on configuration, AERR# is asserted two clocks from observation of valid ADS# if bad parity is discovered on the AP[1:0]#or RP# signals in the two clock Request Phase. AP1# provides parity for signal group A[35:24]#, AP0# provides parity for signal group A[23:3], and RP# provides parity for pins REQ[4:0]# and ADS#. A valid request phase is defined as an ADS# active clock followed by an inactive ADS# clock. AERR# assertion without a matching request phase is a bus protocol violation.

An active AERR# only affects the bus state if AERR# observation is enabled at power-on configuration and if AERR# assertion was associated with a valid request phase. If this is the case, the following state changes occur. All agents remove the transaction from the In-order Queue and update internal state counts. All symmetric agents de-assert arbitration requests BREQ[3:0]#, reset their Rotating ID to 3, and change the ownership state to idle. They regain bus ownership by re-entering arbitration. The priority agent de-asserts BPRI#. An agent that has issued for first transaction of a bus lock operation must de-assert LOCK# on AERR# assertion. The agent may re-assert BREQn# anytime after two clocks to regain bus ownership. An agent that has issued the second or subsequent transaction of a bus lock operation must keep LOCK# active and re-assert BREQn# in two clocks. If the agent de-asserts LOCK# along with its bus request, the agent may begin a new arbitration anytime after two clocks. All remaining agents must wait a minimum of four clocks prior to re-asserting their requests for bus arbitration. The smaller waiting period for the agent in the middle of a bus lock operation to begin arbitration guarantees bus ownership to that agent. A Request Phase associated with a subsequent transaction and subsequent phases of transactions loaded previously in the In-order Queue continues as though the aborted transaction never entered in the In-order Queue. If AERR# observation is disabled at power-on configuration, no bus agents change bus state on observing active AERR#. Thus, an apparatus and method for performing error correction in a multi-processor system is disclosed.

What is claimed is:

1. In a multi-processor system having a first processor, a second processor, and a bus coupling said first processor to said second processor, a method of performing transactions on said bus comprising the steps of:

detecting an error in a transaction issued by said first processor;

aborting said transaction;

arbitrating between said first processor and said second processor for access to said bus;

detecting that said first processor and said second processor simultaneously have access to said bus;

performing an arbitration re-synchronization process;

retrying said transaction by said first processor.

2. The method of claim 1, wherein said step of performing an arbitration re-synchronization process is comprised of the steps of:

de-asserting bus requests corresponding to said first processor and said second processor;

re-arbitrating for access to said bus, wherein re-arbitration corresponding to said first processor is performed ahead of re-arbitration corresponding to said second processor.

3. The method of claim 2 further comprising the step of locking said transaction, wherein said transaction is completed by said first processor without interruption by said second processor.

4. The method of claim 2, wherein said first processor begins said re-arbitration two clock cycles before said second processor begins said re-arbitration.

5. The method of claim 2 further comprising the steps of:

said first processor processing a plurality of pipelined transactions;

determining whether a first pipelined transaction is locked or unlocked;

performing said arbitration re-synchronization if said first pipelined transaction is locked;

if said first pipelined transaction is unlocked, determining whether a second pipelined transaction following said first pipelined transaction, is locked or unlocked;

indicating an arbitration error if said second pipelined transaction is locked and overlapped pipelined transactions are detected;

if said second pipelined transaction is unlocked:
   i) allowing said first pipelined transaction to continue;
   ii) performing said arbitration re-synchronization process for said second pipelined transaction.

6. The method of claim 2, wherein said arbitrating step supports a distributed arbitration scheme, wherein arbitration signals corresponding to said first processor and said second processor are generated and said first processor and said second processor observe said arbitration signals to determine ownership of said bus.

7. The method of claim 2, further comprising the step of generating parity bits for protecting an address signal, a request signal, and a strobe signal.

8. In a multi-processor system having a first processor, a second processor, and a bus coupling said first processor to said second processor, an apparatus comprising:

a parity circuit for detecting an error in a transaction issued by said first processor;

an execution unit coupled to said parity circuit for aborting said transaction, wherein said first processor retries said transaction;

an arbitration circuit coupled to said execution unit for arbitrating access to said bus between said first processor and said second processor, wherein if said first processor and said second processor simultaneously have access to said bus, an arbitration re-synchronization process is performed.

9. The apparatus of claim 8, wherein said arbitration circuit de-asserts bus requests and re-arbitration corresponding to said first processor is performed ahead of re-arbitration corresponding to said second processor.

10. The apparatus of claim 9 further comprising a lock circuit for locking said transaction so that said transaction is completed by said first processor without interruption by said second processor.

11. The apparatus of claim 9, wherein said first processor begins said re-arbitration two clock cycles before said second processor begins said re-arbitration.

12. The apparatus of claim 9, wherein said first processor processes a first pipelined transaction and a second pipelined transaction in a plurality of pipeline stages.

13. The apparatus of claim 12, wherein said arbitration re-synchronization process is performed if said first pipelined transaction is locked.

14. The apparatus of claim 13, wherein if said first pipelined transaction is unlocked and said second pipelined transaction is unlocked, said first pipelined transaction is allowed to continue and said arbitration re-synchronization process is performed.

15. The apparatus of claim 9, wherein said arbitration circuit supports a distributed arbitration scheme, wherein arbitration signals corresponding to said first processor and said second processor are generated and said first processor and said second processor observe said arbitration signals to determine ownership of said bus.

16. The apparatus of claim 9, further comprising a parity generator for generating parity bits to protect an address signal, a request signal, and a strobe signal.

17. In a multi-processor system having a first processing means, a second processing means, and a communication means coupling said first processing means to said second processing means, an apparatus for correcting an error in a transaction issued by said first processing means, said apparatus comprising:

a parity means for detecting said error;

an execution means coupled to said parity means for aborting said transaction, wherein said first processing means retries said transaction;

an arbitration means coupled to said execution means for arbitrating access to said communication means between said first processing means and said second processing means, wherein if said first processing means and said second processing means simultaneously have access to said communication means, an arbitration re-synchronization process is performed.

18. The apparatus of claim 17, wherein said arbitration means de-asserts bus requests and re-arbitration corresponding to said first processing means is performed ahead of re-arbitration corresponding to said second processing means.

19. The apparatus of claim 18 further comprising a lock means for locking said transaction so that said transaction is completed by said first processing means without interruption by said second processing means.

20. The apparatus of claim 18, wherein said first processing means begins said re-arbitration two clock cycles before said second processing means begins said re-arbitration.

21. The apparatus of claim 18, wherein said first processing means processes a first pipelined transaction and a second pipelined transaction in a plurality of pipeline stages.

22. The apparatus of claim 21, wherein said arbitration re-synchronization process is performed if said first pipelined transaction is locked.

23. The apparatus of claim 22, wherein if said first pipelined transaction is unlocked and said second pipelined transaction is unlocked, said first pipelined transaction is allowed to continue and said arbitration re-synchronization process is performed.

24. The apparatus of claim 18, wherein said arbitration means supports a distributed arbitration scheme, wherein arbitration signals corresponding to said first processing means and said second processing means are generated and said first processing means and said second processing means observe said arbitration signals to determine ownership of said communication means.

25. The apparatus of claim 18, further comprising a parity generation means for generating parity bits to protect an address signal, a request signal, and a strobe signal.

26. A computer system comprising:

a first processor for processing data;

a second processor for processing data;

a bus coupling said first processor to said second processor;

a parity circuit for detecting an error in a transaction issued by said first processor;

an execution unit coupled to said parity circuit for aborting said transaction;

an arbitration circuit coupled to said execution unit for arbitrating access to said bus between said first processor and said second processor, wherein if said first processor and said second processor simultaneously have access to said bus, an arbitration re-synchronization process is performed.

27. The computer system of claim 26, wherein said arbitration circuit de-asserts bus requests and re-arbitration corresponding to said first processor is performed ahead of re-arbitration corresponding to said second processor.

28. The computer system of claim 27 further comprising a lock circuit for locking said transaction so that said transaction may be completed by said first processor without interruption by said second processor.

29. The computer system of claim 27, wherein said first processor begins said re-arbitration two clock cycles before said second processor begins said re-arbitration.

30. The computer system of claim 27, wherein said first processor processes a first pipelined transaction and a second pipelined transaction in a plurality of pipeline stages.

31. The computer system of claim 30, wherein said arbitration re-synchronization process is performed if said first pipelined transaction is locked.

32. The computer system of claim 31, wherein if said first pipelined transaction is unlocked and said second pipelined transaction is unlocked, said first pipelined transaction is allowed to continue and said arbitration re-synchronization process is performed.

33. The computer system of claim 27, wherein said arbitration circuit supports a distributed arbitration scheme, wherein arbitration signals corresponding to said first processor and said second processor are generated and said first processor and said second processor observe said arbitration signals to determine ownership of said bus.

34. The computer system of claim 27, further comprising a parity generator for generating parity bits to protect an address signal, a request signal, and a strobe signal.

* * * * *